United States Patent
Scott et al.

(10) Patent No.: US 10,581,249 B2
(45) Date of Patent: Mar. 3, 2020

(54) BATTERY ENERGY STORAGE SYSTEM INTEGRATED WITH ELECTRICAL GENERATION SITE

(71) Applicant: Inventus Holdings, LLC, Juno Beach, FL (US)

(72) Inventors: Michael A. Scott, Palm Beach Gardens, FL (US); Carmine A. Priore, III, Wellington, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 123 days.

(21) Appl. No.: 15/812,087

(22) Filed: Nov. 14, 2017

(65) Prior Publication Data

US 2019/0148943 A1      May 16, 2019

(51) Int. Cl.
*H02J 3/32* (2006.01)
*H02P 9/02* (2006.01)
(Continued)

(52) U.S. Cl.
CPC .............. *H02J 3/32* (2013.01); *F03D 7/028* (2013.01); *F03D 7/0284* (2013.01); *F03D 7/048* (2013.01);
(Continued)

(58) Field of Classification Search
CPC ...... H02J 3/32; H02J 3/38; H02J 3/386; H02J 15/00; H02J 15/003; H02P 9/02;
(Continued)

(56) References Cited

U.S. PATENT DOCUMENTS

| 4,551,980 A | 11/1985 | Bronicki |
| 7,902,686 B2 | 3/2011 | Anderson et al. |

(Continued)

FOREIGN PATENT DOCUMENTS

| CN | 201794993 | 4/2011 |
| CN | 101989806 | 8/2012 |

(Continued)

OTHER PUBLICATIONS

Liserre, Marco et al., "Future Energy Systems Integrating Renewable Energy Sources into the Smart Power Grid Through Industrial Electronics", IEEE Industrial Electronics Magazine, vol. 4, Issue 1, Mar. 2010, pp. 18-37. Mar. 2010.

(Continued)

*Primary Examiner* — Rexford N Barnie
*Assistant Examiner* — Jagdeep S Dhillon
(74) *Attorney, Agent, or Firm* — Jeffrey N. Giunta; Fleit Intellectual Property Law (57) ABSTRACT

A method of creating an interconnected combination of a stored energy electric generation system to a variable electric power generation system, said combination, and a method of operating same. A stored energy electric generation system is added to a variable output electric power generation system. An input/output of the stored energy electric power generation system is connected to a power output of the variable electric power generation system and an indicator of power flow level through the power input/output of the stored energy electric power generation system is provided to a controller of the variable electric power generation system. The controller is configured to adjust the output power of the variable electric power generation system based on the indicator of the present stored energy system electric power flow level and a present site output electric power level.

20 Claims, 5 Drawing Sheets

(51) Int. Cl.
*F03D 7/04* (2006.01)
*H02J 3/38* (2006.01)
*F03D 7/02* (2006.01)
*F03D 9/11* (2016.01)
*H02J 3/28* (2006.01)

(52) U.S. Cl.
CPC .................. *F03D 9/11* (2016.05); *H02J 3/28* (2013.01); *H02J 3/386* (2013.01); *H02P 9/02* (2013.01); *F05B 2220/706* (2013.01)

(58) Field of Classification Search
CPC . F03D 7/048; F03D 7/028; F03D 7/02; F03D 7/04; F03D 9/17; G05B 13/048; G05B 17/02; G05B 11/01; G06Q 10/00; G06Q 10/20; F15B 17/02; F15B 1/033; F03B 13/18; F25D 16/00; G06G 7/63
USPC .......................................................... 307/17
See application file for complete search history.

(56) References Cited

U.S. PATENT DOCUMENTS

| | | | |
|---|---|---|---|
| 7,974,742 B2 | 7/2011 | Enis et al. | |
| 8,324,751 B2 | 12/2012 | Yasugi et al. | |
| 8,332,077 B2 | 12/2012 | Kondo et al. | |
| 8,334,606 B2 | 12/2012 | Oohara et al. | |
| 8,427,098 B2* | 4/2013 | Moore | H02J 7/0013 320/103 |
| 8,860,236 B2 | 10/2014 | Nasiri | |
| 8,970,058 B2 | 3/2015 | Hoshihira et al. | |
| 9,124,135 B2 | 9/2015 | Abe et al. | |
| 9,379,550 B2 | 6/2016 | Peck | |
| 9,690,267 B2 | 6/2017 | Haj-Maharsi et al. | |
| 2009/0058095 A1 | 3/2009 | McClintic | |
| 2009/0093916 A1* | 4/2009 | Parsonnet | F24F 5/0017 700/286 |
| 2010/0102569 A1 | 4/2010 | Pickard, III | |
| 2011/0204720 A1* | 8/2011 | Ruiz | G06Q 50/06 307/66 |
| 2012/0187922 A1 | 7/2012 | Dubois et al. | |
| 2013/0241485 A1* | 9/2013 | Snyder | B60L 58/15 320/109 |
| 2013/0249300 A1* | 9/2013 | Fishman | H01L 31/02016 307/82 |
| 2014/0070619 A1* | 3/2014 | Fornage | H02J 3/383 307/82 |
| 2014/0265330 A1 | 9/2014 | Carkner | |
| 2016/0087443 A1* | 3/2016 | Ballantine | H02J 3/006 307/82 |
| 2016/0233679 A1 | 8/2016 | Li et al. | |
| 2017/0279303 A1* | 9/2017 | Bauer | F03B 13/142 |
| 2017/0364043 A1* | 12/2017 | Ganti | G05B 13/048 |
| 2018/0034273 A1* | 2/2018 | Imai | G06Q 50/06 |

FOREIGN PATENT DOCUMENTS

| | | |
|---|---|---|
| WO | 2006114301 | 11/2006 |
| WO | 2009142477 | 11/2009 |
| WO | 2011099142 | 8/2011 |
| WO | 2011129003 | 10/2011 |
| WO | 2012031547 | 3/2012 |

OTHER PUBLICATIONS

Teleke, Sercan et al. "Optimal Control of Battery Energy Storage for Wind Farm Dispatching." IEEE Transactions on Energy Conversion. vol. 24, No. 3, Sep. 2009, pp. 725-732. Sep. 2009.

Jiang, Zhenhua & Yu, Xunwei. (2009). Modeling and control of an integrated wind power generation and energy storage system. Power & Energy Society General Meeting, 2009, PES '09, IEEE, 2009. 2009.

* cited by examiner

BATTERY ENERGY STORAGE SYSTEM INTEGRATED WITH ELECTRICAL GENERATION SITE

FIELD OF THE DISCLOSURE

The present disclosure generally relates to the electric power generation, and more particularly to accommodating combinations of stored energy electric power generation and electric generation sites.

BACKGROUND

Many electric generation sites, including renewable energy electric generation sites such as wind turbine electric power generation farms, have controllers that operate to control the generation systems in a manner that can vary the amount of electric power the site produces. For example, wind turbine electric generators are able to accommodate varying wind speeds in order to produce a specified electric power output such as, for example, by varying blade pitch. Actions to control the speed of wind turbine electric generators, such as varying blade pitch, are also able to be used to control the total amount of electric power output by the wind turbine and allow the one or more wind turbines in a wind turbine electric power generation farm to generate less electric power than could be generated under existing wind conditions.

Electric generation sites are dispatched, i.e., decisions are made as to whether to operate or not operate a particular electric generation site and in setting the amount of electric power each site is to generate at a particular time, in order to provide power to an electric distribution grid according to the electric power demands of various electric power consumers such as, but not limited to, transmission line customers or end consumers. Dispatching of electric generation sites is also able to be based on other criteria such as, but not limited to, criteria set forth in various power purchase agreements, other criterion known to those familiar with the art, or any combination of these. In various examples, the frequency, voltage, or both, that are present on an electric distribution grid is able to vary due to differences between the amount of electric power being consumed by customers connected to an electric distribution gird and the amount of electric power being generated and delivered to the electric distribution grid.

Stored energy electric generation systems, such as Battery Energy Storage Systems (BESS), provide advantages to the operation of the electric power grid. For example, such stored energy electric generation systems, or BESS, are able to provide for frequency response in order to control frequency shifts due to mismatches between electric power generation and demand. Additionally, such stored energy electric generation systems, or BESS, are able to provide load shifting as is known to those familiar with the art. In general, stored energy electric generation systems are dispatched to produce power in order to meet objectives or requirements of operating and regulating the quality of power on the grid, such as frequency regulation or other criterion known to those familiar with the art.

Such stored energy electric generation systems, or BESS, are able to be installed at any of a number of locations and connected to the electric distribution grid. The installation of a stored energy electric generation systems, or BESS, requires resources such as real estate, power busses, over-current protection devices such as breakers, electric power interconnection structures such as electric power buss structures, low voltage to high voltage transformers, monitoring equipment and infrastructure such as, for example, Supervisory Control and Data Acquisition (SCADA) equipment, other resources, or any combination of these.

Electrical generation sites such as wind turbine or solar farms, which generate renewable energy, as well as other types of sites such as gas, nuclear and coal powered generation sites may have additional underutilized resources such as available real estate area, existing unused electric protection devices such as breakers, unused or underused electrical buss structures, low voltage to high voltage transformer electrical power capacity, other resources, or combinations of these. The availability of such existing but unused or underutilized resources at existing electrical generation sites may be a factor in determining where to install additional stored energy electric generation systems.

The operations of some renewable energy electric generation sites are able to be improved by adding stored energy electric generation systems to the generation site to augment the electric power output of the generation site. In an example, a wind turbine electric power generation farm with a stored energy electric generation system may produce an excess of electric power, such as during a very windy night. When there is an excess of electric power production, the stored energy electric generation system is able to store the excess energy for later electric power production. When more electric power is desired, the stored energy system is able to deliver electric power from the previously stored energy in addition to the electric power produced by the wind turbine electric power generation farm.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods describe techniques to integrate stored energy electric generation systems with variable output electric generation systems. Examples of variable output electric generation systems include renewable energy electric generation systems such as a wind turbine electric generation farm. In some examples, a wind turbine electric generation farm produces electric power and delivers that power to an electric power transmission system. The wind turbine electric generation farm has a site output power meter that measures a present site output electric power level, which is a total amount of electric power that is delivered by the entire site to the electric power transmission system. This site output power meter in an example is connected to the high voltage side of an output transformer connecting the entire site to an electric transmission system.

In an example, the site output power meter provides an indication of the present site output electric power level, which is a total amount of electric power being delivered by the site, to a controller for the wind turbine electric generation farm. The controller uses that indication of the present site output electric power level to control the electric power output of the wind turbine electric generation farm. In an example, that controller sends commands to the individual wind turbines to adjust their output power such as, for example, by varying blade pitch, controlling the electric generation machinery to produce more or less electric power.

In some examples, a stored energy electric generation system is added to a renewable energy electric generation system, such as a wind turbine farm, thereby allowing for the utilization of available pre-existing resources such as real estate, breakers, power busses, and/or transformer capacity. Since the power generated or consumed by the stored energy electric generation system may in some instances be substantially insignificant relative to the power generated by the renewable energy electric generation system, utilization of available resources may result in an economic advantage by integrating the stored energy electric generation system into the renewable energy electric generation system. The stored energy electric generation system is able to receive electric power to store as energy, and to deliver electric power from previously stored energy. As such, the stored energy electric generation system has a power input/output connection to receive or deliver electric power according to the demands of the overall site. In the following discussion, the electric power being consumed or produced by the stored energy electric generation system at a present time is referred to as a present stored energy system electric power flow level. In the following discussion, electric power being consumed by the stored energy electric generation system is indicated by a present stored energy system electric power flow level with a negative value, while electric power being produced by the stored energy electric generation system is indicated by a present stored energy system electric power flow level with a positive value.

Integrating a stored energy electric generation system with a renewable energy electric generation system can be accomplished by connecting the power input/output connection of the stored energy electric generation system to the low voltage side of the output transformer that also connects the renewable energy electric generation system to the electric power transmission system. Connecting the power input/output connection of the stored energy electric power generation system to the low voltage side of the output transformer for the site can form a more efficient electric connection between the stored energy electric generation system and the output of the renewable energy electric generation site to provide for efficient delivery of electric power from the renewable energy electric power generation system to the energy storage electric generation system.

In a configuration where power consumed or produced by the stored electric energy generation system is also provided through the site output power meter of the entire site, the site output power meter measures the total electric power output of the site which is a combination of the electric power generated by the renewable energy electric generation site and the present stored energy system electric power flow level through the power input/output of the stored energy electric power generation system. In some examples, the electric energy generation site and the stored energy electric power generation system are each dispatched independently from one another. In examples where these two electric power generation systems are dispatched independently, the electric energy generation site and the stored energy electric power generation system are each able to vary their electrical power output independently of electrical power output of the other system. In an example, the electric energy generation site is dispatched in accordance with the need to provide power to the grid, while the stored energy electric power generation system is dispatched to regulate the quality of the power on the grid.

The present stored energy system electric power flow level through the power input/output of the stored energy electric power generation system indicates the amount of electric power that is consumed or produced by the energy storage electric power generation system. The present stored energy system electric power flow level when the power input/output of the stored energy electric power generation system is producing electric power adds to the electric power produced by the renewable energy electric generation site. The present stored energy system electric power flow level through the power input/output of the stored energy electric power generation system when the stored energy electric power generation system is consuming electric power to store energy for later electric power production is subtracted from the power output by the electric power produced by the renewable energy electric generation site.

Electric power consumed or produced by a stored energy electric generation system can affect the operation of the renewable energy electric generation system when the output power is controlled based on the total site electric power output. In an example, the present site output electric power level reported by a power meter that reports the output electric power of the entire site includes not only the electric power produced by the renewable energy electric generation system but also the present stored energy system electric power flow level though the power input/output of the interconnected stored energy electric power generation system. A controller in such a situation is generally configured to maintain an output power level as reported by the site output power meter at a specified set point for the renewable energy electric generation system. The electric power consumed or produced by the stored energy electric generation system causes the total output power of the site to increase or decrease, which causes a conventional renewable energy electric generation system controller to compensate by increasing or reducing the electric power output of the controlled renewable energy electric generation system to maintain the total power output as reported by the site output power meter at the specified set point.

In some conditions, the operation of the renewable energy electric generation system may become unstable due to the introduction of power that is produced or consumed by the stored energy electric generation system. In an example of a wind turbine electric generation farm that is operating with a stored energy electric generation system, the controller causes reductions or increases in the electric power produced by each wind turbine to compensate for variations in the electric power consumption or production of the independently dispatched stored energy electric generation system. The control loop implemented by this controller may cause oscillations in the output power of the wind turbines, which causes variations in the physical force exerted on the blades of the wind turbines. This variation in physical force on the blades of the wind turbines is able to occur in a periodic manner that can result in physical oscillations of the wind turbine support structure. Such oscillations have been observed and can result in an alarm condition that can result in the controller to shut down the operation of the wind turbine.

For example, each wind turbine faces into the wind to harvest wind power and presents a wind load that this transmitted to the ground via the wind tower, resulting in a torque and correspond flexing of the tower. As the independently dispatched stored energy electric generation system modulates its power to, for example, facilitate grid regulation, the pitch of the wind turbine blades is shifted based on signals from the wind farm system controller in order to correspondingly modulate the amount of power generated by the wind turbine electric generation farm to compensate for the power modulation of the stored energy electric generation system. The modulation of the wind turbine power results in a corresponding modulation of the wind load presented by the wind turbine onto the wind tower. This results in a modulation of the torque on the wind tower and a correspond modulation of the flexing of the wind tower. Under certain wind conditions, when the modulation of the power output of the stored energy electric generation system has frequency components that correspond to a resonant frequency of the flexing of a wind turbine or wind tower, a resonance motion has been observed to build in the wind tower, resulting is a visible flexing oscillation of the wind turbine.

The development of resonant oscillations in the wind turbine or wind tower structure can stress components of the wind turbine, resulting in premature failure of the wind turbine. The oscillations can reach such a magnitude that an excessive motion safety system in the wind turbine trips, shutting down the wind turbine. In some examples, the initial trip of the excessive motion safety system resets itself automatically and allows the wind turbine to restart without intervention by service personnel. After such an automatic reset, the wind turbine restarts and may again be subject the periodic flexing oscillations that may again cause the excessive motion safety system to trip. In some examples, a second trip the excessive motion safety system inhibits automatic resetting, requiring an operator to travel to the wind turbine to manually reset the wind turbine to allow the wind turbine to restart. This need for operator intervention may result in the wind turbine being off line and out of operation for an extended period of time as wind farms are very large and often remotely located. Thus, there is a loss of the generation of electric power while the wind turbine is off line.

In order to compensate for lost power caused by wind turbines that are off line due to successive tripping of their excessive motion safety systems, other wind turbines of the wind farm may be controlled to generate additional power. This generation of additional power results in the towers of the remaining operational wind turbines experiencing additional torque and additional flexing, which can increase the magnitude of wind tower flexing due to the modulation of the electrical power output of the stored energy electric generation system. The increased flexing magnitude of the wind towers supporting the other wind turbines that are operating with increased electrical power output is able increase the likelihood that the remaining operational wind turbines will similarly trip off line due to excessive motion detection. Thus as more wind turbines trip off line and require a manual restart, a cascading failure mode may cause numerous wind turbines of the wind farm to trip off line and require a manual resetting. The below described systems and method operate to improve the operation of wind turbine farms that are operating with stored energy electric generation system by advantageously avoiding oscillations in wind towers, wind turbine. Avoiding these oscillations advantageously, or both, and avoiding the resulting tripping of the excessive motion safety systems of the wind turbines, the resulting automatic and manual restarting of those wind turbines, and the cascading shutting down of an increasing number of wind turbines as is described above. The below systems and methods achieve these advantages while simultaneously realizing the advantages of integrating a stored energy electric generation system into a renewable energy electric generation system.

Some examples of the below described systems and methods improve the operations of a renewable energy electric generation site that includes a stored energy electric generation system. These systems and methods improve the stability in the operation of the renewable energy electric generation site that uses measurements of a single site output power meter as an input to a controller of the renewable energy electric generation system that is operating with a stored energy electric generation system. In some examples, the electric consumption or production of the stored energy electric generation system that is contributing to the output of the renewable energy electric generation site is effectively removed from control system processing of the value of the total site electric power output measurements that are provided to the controller.

The below described systems and methods allow for the efficient and cost effective incorporation of stored energy electric generation systems into variable output electric generation sites. The below described systems and methods allow for the incorporation of a stored energy electric generation system with minimal and easily implemented modifications to the variable output electric generation system. Such incorporation can be performed on an existing variable output electric generation system with little down time, modification to existing site equipment, or alteration of site operations. The below described systems and method allow such efficient incorporations in a manner that provides improved stability of the operation of the renewable energy electric generation system.

Figure 1:
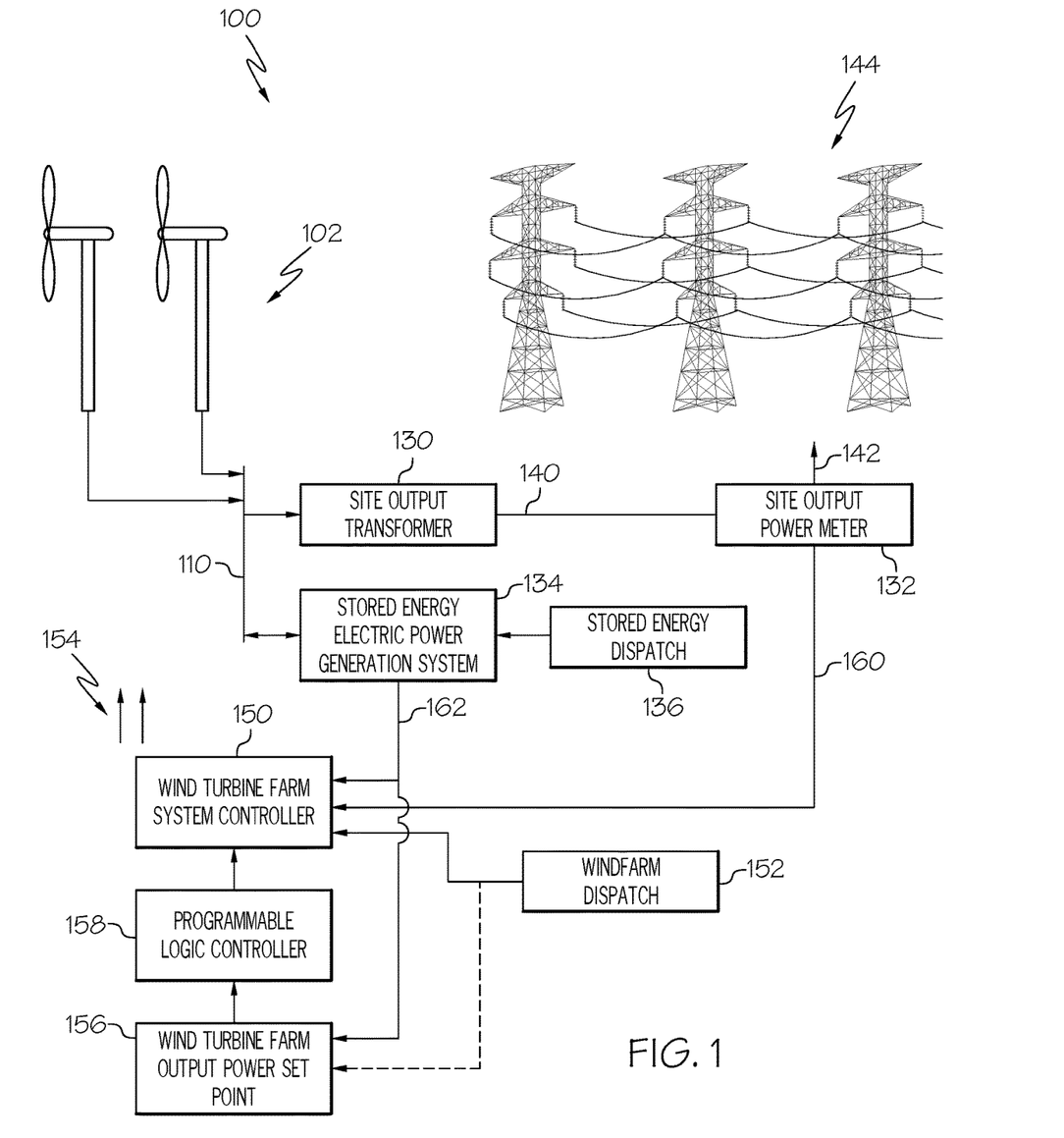
FIG. 1 illustrates a renewable energy electric generation site, according to an example.

FIG. 1 illustrates a renewable energy electric generation site 100, according to an example. The renewable energy electric generation site 100 in this example produces electric power from a renewable source, such as wind power in this example, and delivers that electric power to an electric power transmission system 144. The depicted renewable energy electric generation site 100 is an example of a variable output electric power generation system that includes a wind turbine electric generation farm 102 which is composed of a number of wind turbines.

The renewable energy electric generation site 100 also includes a stored energy electric power generation system 134. As described in further detail below, the stored energy electric power generation system 134 is responsive to signals from a stored energy dispatch function 136 and is electrically connected to a power output of the wind turbine electric generation farm 102 to provide electric power to an electric power output of the renewable energy electric generation site 100. The illustrated renewable energy electric generation site 100 is an example of an interconnected variable electric power generation system and stored energy electric generation system. As discussed above, the stored energy dispatch function 136 signals the stored energy electric power generation system 134 to generate an amount of electric power based on various criteria, such as, for example, meeting objectives or requirements of operating and regulating the quality of power on the grid, such as frequency regulation or other criterion known to those familiar with the art.

Overall operation of the wind turbine electric generation farm 102 is controlled by a wind turbine farm system controller 150. The wind turbine farm system controller 150 is responsive to signals from a wind farm dispatch function 152 and is an example of a variable output electric power generation system controller that controls an electric power output of the variable output electric power generation system. The wind turbine farm system controller 150 in an example issues wind turbine control commands 154 to the wind turbines of the wind turbine electric generation farm 102. In general, each wind turbine has its own controller (not shown) to control the operation of the individual wind turbines. As discussed above, the wind farm dispatch function 152 signals the wind turbine farm system controller 150 to generate an amount of electric power based on various criteria, such as, for example, based on the frequency, voltage, or both, that are present on an electric power transmission system 144.

The wind turbine farm system controller 150 in an example operates to maintain a total electric power output of the renewable energy electric generation site 100 at a specified wind turbine output power set point 156. The wind turbine output power set point 156 in various examples is able to be set or provided by any suitable technique. In some examples, the site output power set point 156 is provided by a higher level control system or is provided by any suitable source. In an example, a wind turbine farm system controller 150 is able to be modified by adding a programmable logic controller 158. The programmable logic controller 158 is an example of an auxiliary controller that is added to the wind turbine farm system controller 150 to create a retrofitted variable output electric power generation system controller. The programmable logic controller 158 in an example provides an adjusted output power set point that is determined based on the present stored energy electric power input/output power flow level indicator 162 received from the stored energy electric power generation system 134. In some examples, the wind turbine output power set point 156 is able to be controlled or affected by a signal from the wind farm dispatch function 152.

The electric outputs of the wind turbines at the wind turbine electric generation farm 102 are connected to a wind turbine farm electric power output buss 110. In an example, these wind turbine electric generators are connected to the wind turbine farm electric power output buss 110 via various electric power interconnection elements (not shown) such as protection devices and other buss structures.

In the illustrated example, a stored energy electric power generation system 134 is also connected to the wind turbine farm electric power output buss 110. As is understood by practitioners of ordinary skill in the relevant arts, the stored energy electric power generation system 134 is able to receive electric power from, or to provide electric power to, the wind turbine farm electric power output buss 110. The stored energy electric power generation system 134 has a power input/output through which a present electric power flow is provided to the wind turbine farm electric power output buss 110.

The operation of the stored energy electric power generation system 134 is able to be based on any suitable criteria, such as a configuration to consume electric power under specified conditions for storage within the stored energy electric power generation system 134. The configuration of the stored energy electric power generation system 134 is also able to cause the stored energy electric power generation system 134 to produce electric power under various conditions. In some examples, the present stored energy system electric power flow level through the input/output of the stored energy electric power generation system 134 is independent of direct control by the wind turbine farm system controller 150.

In the illustrated example, the stored energy electric power generation system 134 produces a present stored energy electric power input/output power flow level indicator 162 as an output signal. The present stored energy electric power input/output power flow level indicator 162 indicates present stored energy system electric power flow level through the input/output of the stored energy electric power generation system 134, which is the present amount of electric power consumed or produced by the stored energy electric power generation system 134. The wind turbine farm system controller 150 in an example has been adapted to receive the present stored energy electric power input/output power flow level indicator 162. As described in further detail below, the processing of the wind turbine farm system controller 150 to control the wind turbines in the wind turbine electric generation farm 102 in some examples is adapted to compensate for the amount of electric power being consumed or produced by the stored energy electric power generation system 134.

The wind turbine farm electric power output buss 110 is also connected to a site output transformer 130. In general, the site output transformer 130 steps up the voltage present on the wind turbine farm electric power output buss 110 to a higher voltage that is present on the electric power transmission system 144. In the illustrated example, the stored energy electric power generation system 134 and the wind turbine electric generation farm 102 both provide output electric power to the low voltage side of the site output transformer 130.

The site output transformer 130 produces electric power with a stepped up voltage at its high voltage output 140. The high voltage output 140 of the site output transformer 130 is connected in the illustrated example to a site output power meter 132. The site output power meter 132 conveys this high voltage electric power output to the electric power transmission system 144 through a transmission system connection 142.

The electric power delivered to the site output transformer 130 is the combination of the amount of electric power produced by the wind turbine electric generation farm 102 and the electric power either produced or consumed by the stored energy electric power generation system 134. When the stored energy electric power generation system 134 is producing electric power, the total electric power delivered to the site output transformer 130, and thus to the electric power transmission system 144 through the site output power meter 132, is generally approximately the sum of the output electric power of the wind turbine electric generation farm 102 and the stored energy electric power generation system 134. When the stored energy electric power generation system 134 is consuming electric power, the total electric power delivered to the site output transformer 130, and thus to the electric power transmission system 144 through the site output power meter 132, is generally the output electric power of the wind turbine electric generation farm 104 decreased by approximately the amount of power consumed by the stored energy electric power generation system 134.

The site output power meter 132 provides a present site output power indication 160 to the wind turbine farm system controller 150. The present site output power indication 160 is an example of an indicator of a total site electric power output. The wind turbine farm system controller 150 receives the present site output power indication 160 from the site output power meter 132 and controls the electric power output of the wind turbine electric generation farm 102 to maintain a specified output power level to the electric power transmission system 144. As described below, the wind turbine site controller in an example is configured to also accept a present stored energy electric power input/output power flow level indicator 162 from the stored energy electric power generation system 134. The wind turbine farm system controller 150 in some examples controls the electric power output of the wind turbine electric generation farm 102 based on both the present site output electric power level and the present stored energy system electric power flow level. In an example, the wind turbine farm system controller 150 is configured to remove the amount of power consumed or produced by the stored energy electric power generation system 134, as is conveyed in the stored energy electric power input/output power flow level indicator 162, from the determination of the output level to set for the wind turbine electric generation farm 102.

Figure 2:
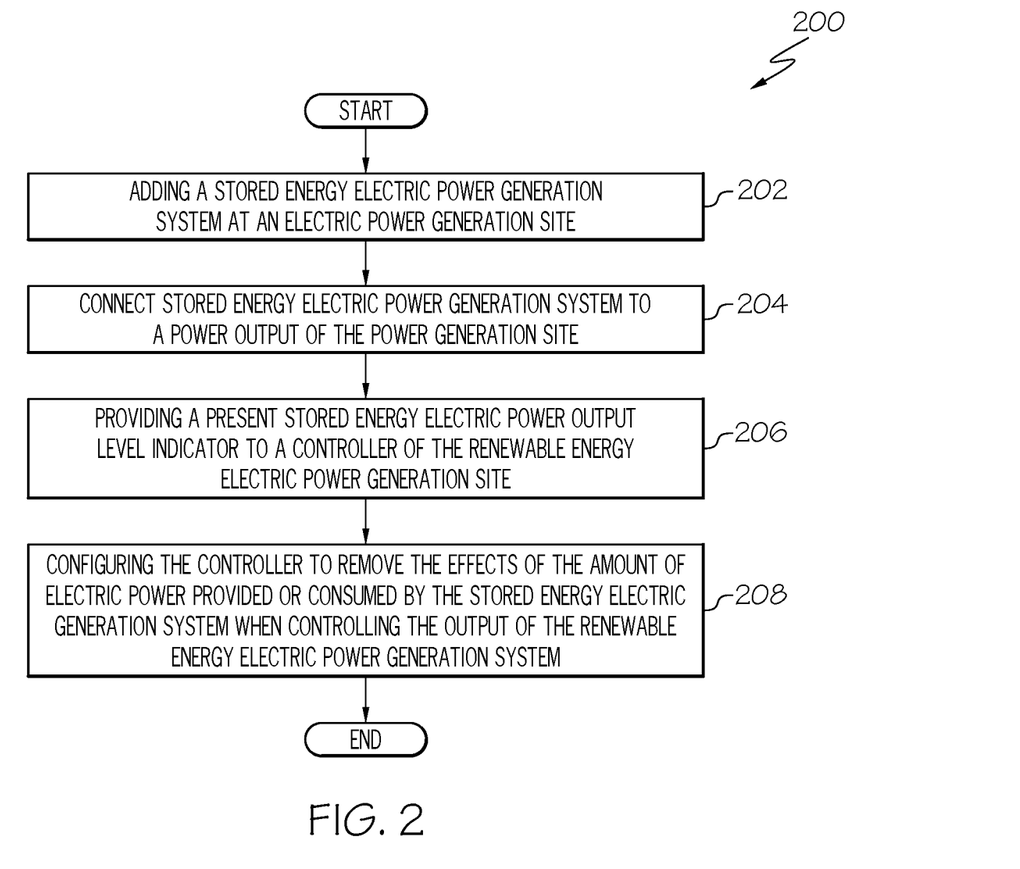
FIG. 2 illustrates a renewable energy/stored energy electric power generation system integration process, according to an example.

FIG. 2 illustrates a renewable energy/stored energy electric power generation system integration process 200, according to an example. The renewable energy/stored energy electric power generation system integration process 200 is an example of activities performed to incorporate a stored energy generation system, such as the stored energy electric power generation system 134 described above, into an electric power generation site, such as a renewable energy electric power generation site. Reference is made to the above described renewable energy electric generation site 100 in the following description of the renewable energy/stored energy electric power generation system integration process 200. In an example, the renewable energy/stored energy electric power generation system integration process 200 results in establishing a renewable energy electric generation site 100, which is an example of an interconnected variable electric power generation system and stored energy electric generation system, as is described above.

In some examples, the renewable energy/stored energy electric power generation system integration process 200 operates to integrate a stored energy electric power generation system with an existing variable output electric power generation system, such as an existing wind turbine electric generation farm similar to the above described wind turbine electric generation farm 102. In some examples, the existing variable output electric power generation system is an operational variable electric power generation system.

The renewable energy/stored energy electric power generation system integration process 200 beings by adding, at 202, a stored energy electric power generation system at an electric power generation site. An example of such an electric power generation site into which a stored energy electric power generation system is added is the above described wind turbine electric generation farm 102. In the context of the above described example, the stored energy electric power generation system 134 is added in one example to a wind turbine electric generation farm 102. Adding a stored energy electric power generation system is able to be performed at an existing renewable energy site, or is able to be performed during the construction of a new renewable energy electric power generation site. In various examples, the above described stored energy electric power generation system 134 is able to be added to any electric power generation site, such as an existing or newly constructed wind turbine electric generation farm 102. In some examples, adding the stored energy electric power generation system is able to include utilizing unused or underutilized resources of the electric power generation site. For example, as discussed in part below, the electric power output of the stored energy electric power generation system is able to be connected to protection equipment, buss structures, other resources, or combinations of these. Further, in some examples other resources available at the electric power generation site are able to be used in conjunction with the operation of the stored energy electric power generation system such as existing monitoring systems or equipment, other infrastructure, other resources, or combinations of these.

A power input/output of the stored energy electric power generation system is connected to a power output of the power generation site, at 204. In an example, the power input/output of the stored energy electric power generation system 134 is connected to an existing buss structure, such as the above described wind turbine farm electric power output buss 110 present in an existing wind turbine electric generation farm, other components, or combinations of these that are located at the power generation site.

The renewable energy/stored energy electric power generation system integration process 200 includes providing, at 206, a present stored energy electric power output level indicator to a controller of the renewable energy electric power generation site. An example of this connecting an indicator communications path between the stored energy electric power generation system 134 and the wind turbine farm system controller 150 to convey the present stored energy electric power input/output power flow level indicator 162. In further examples, the present stored energy electric power output level indicator is able to be provided to a programmable logic controller 158, as is described above, to process, condition, otherwise operate on, or perform combinations of these on, the present stored energy electric power output level indicator. In some such examples, the programmable logic controller 158 receives the present stored energy electric power input/output power flow level indicator 162 from the stored energy electric power generation system 134 and provides to the controller of the renewable energy electric power generation site a conditioned output that is based on the received present stored energy electric power output level indicator.

The renewable energy/stored energy electric power generation system integration process 200 includes configuring, at 208, the controller to remove the effects of the amount of electric power provided or consumed by the stored energy electric generation system when controlling the output of the renewable energy electric power generation system. As described in further detail below, one example of such a configuration is to configure the controller to subtract the present stored energy electric power input/output power flow level indicator 162 from the value of the present site output power indication 160 as is reported by the site output power meter 132 prior to determining an amount of output power the wind turbine electric generation farm 102 should produce. Another example of such a configuration is to configure the controller to add the value of the present stored energy electric power input/output power flow level indicator 162 to the value of the wind turbine output power set point 156 prior to determining an amount of output power the wind turbine electric generation farm 102 should produce.

Figure 3:
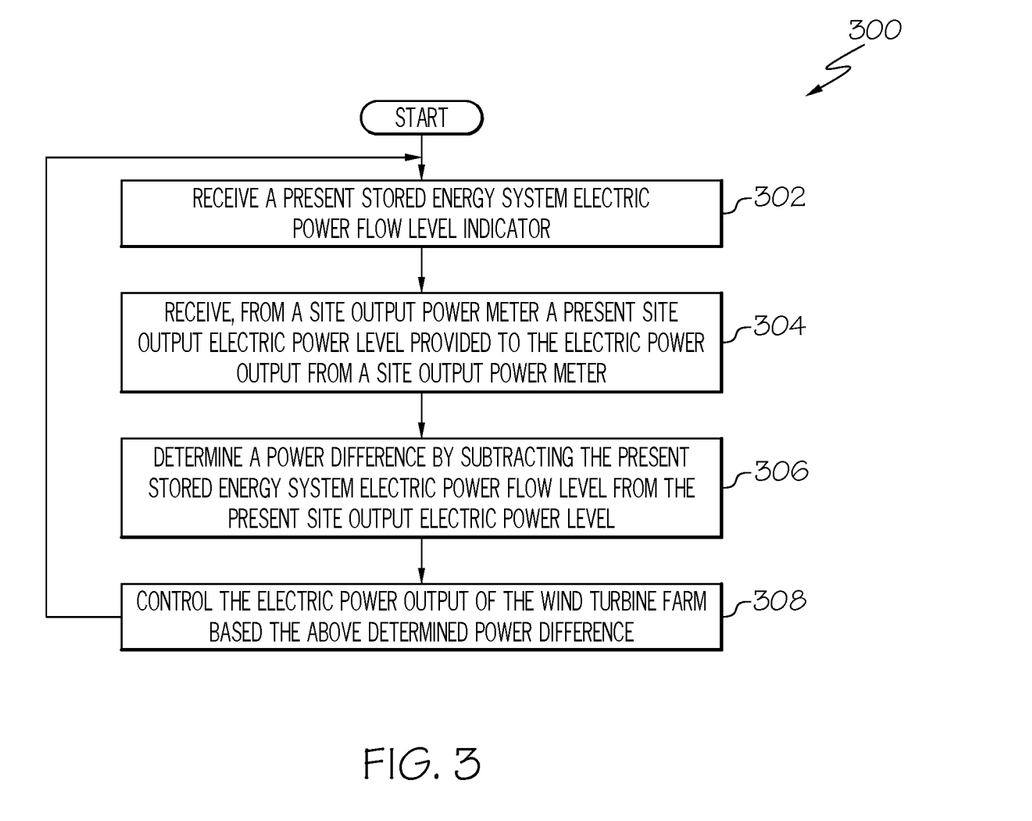
FIG. 3 illustrates a first wind turbine site controller process, according to an example.

FIG. 3 illustrates a first wind turbine site controller process 300, according to an example. The first wind turbine site controller process 300 is described with reference to the renewable energy electric generation site 100 and the renewable energy/stored energy electric power generation system integration process 200 discussed above. The first wind turbine site controller process 300 is an example of a process performed by the wind turbine farm system controller 150 after the renewable energy/stored energy electric power generation system integration process 200 has been performed. In an example, the first wind turbine site controller process 300 is performed by the wind turbine farm system controller 150 after it has been configured to receive and adjust for the present stored energy electric power input/output power flow level indicator 162.

In some examples, the wind turbine farm system controller 150 is an existing component typically manufactured and licensed by a third party having a control process implemented by software that is designed, developed, or both, by the third party. Adapting the control process, such as by modifying software contained in an existing wind turbine farm system controller, to be responsive to the present stored energy electric power input/output power flow level indicator 162 may be difficult or not feasible due to cost or other considerations. For example, such software modifications may require additional software development by the third party and additional corresponding licensing activities for the software modifications. In some examples where modification of the wind turbine farm system controller 150 is not desired, some or all of the first wind turbine site controller process 300 is able to be implemented by various components, including a programmable logic controller 158 that in some examples can be added to a renewable energy electric generation site 100. As is further described below, another controller process is able to be implemented in another controller.

The first wind turbine site controller process 300 receives, at 302, a present stored energy system electric power flow level indicator. In an example, the wind turbine farm system controller 150 receives the present stored energy electric power input/output power flow level indicator 162 from the stored energy electric power generation system 134. Receiving the present stored energy system electric power flow level is an example of determining a present stored energy system electric power flow level.

The first wind turbine site controller process 300 includes receiving, at 304, a present site output electric power level provided to the electric power output from a site output power meter. An example of such receiving is the wind turbine farm system controller 150 receiving the present site output power indication 160 from the site output power meter 132.

A power difference is determined, at 306, by subtracting the indicated present stored energy electric power flow level from the present site output electric power level.

The first wind turbine site controller process 300 also includes controlling, at 308, the electric power output of the wind turbine farm based on the above determined power difference. Controlling the electric power output of the wind turbine farm based on the above determined difference is an example of controlling the electric power output based on both the present site output electric power level and the present stored energy system electric power flow level. In some examples where a power output set point indicating a total output power for the variable output electric power generation system is received, the controlling also includes commanding the variable output electric power generation system to produce electric output power based on an adjusted output power set point that is determined based on subtracting the present stored energy system electric power flow level through the power input/output of a stored energy electric power generation system from the power output set point.

The first wind turbine site controller process 300 then returns to receiving, at 302, a present stored energy system electric power flow level indicator, as is described above, and further continues with the above described processing.

Figure 4:
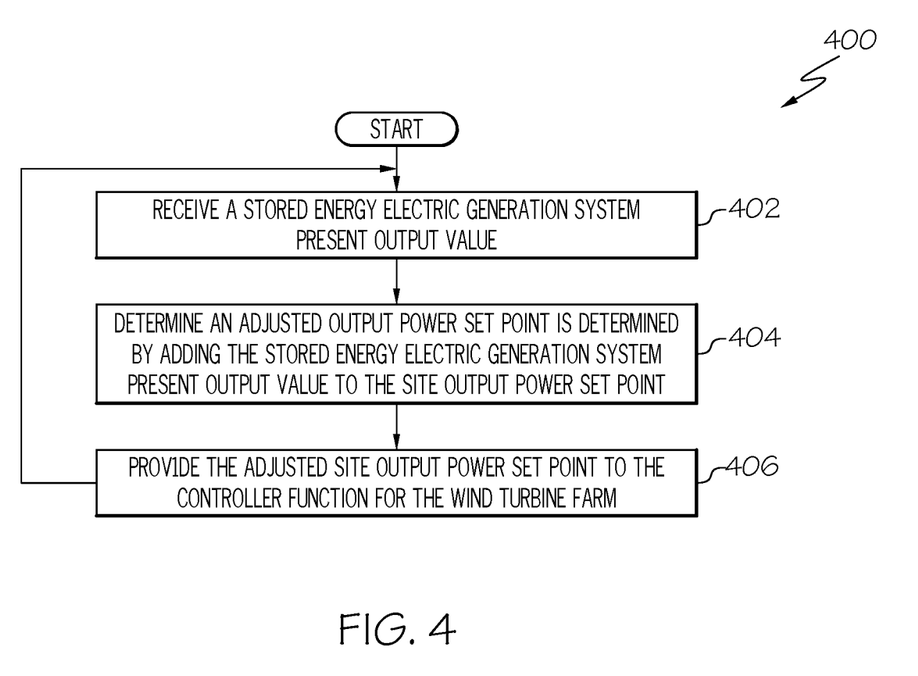
FIG. 4 illustrates a second wind turbine site controller process, according to an example.

FIG. 4 illustrates a second wind turbine site controller process 400, according to an example. Since the wind turbine farm system controller 150 is an existing component typically manufactured and licensed by a third party having a control process implemented by software developed by the third party, adapting the control process to be responsive to the present stored energy electric power input/output power flow level indicator 162 may not be allowed by the third party or may not be economically practicable. In an example, the process of FIG. 4 may be performed by a process operating within programmable logic controller 158 that is installed in conjunction with the integration of the a stored energy electric generation system, thereby avoiding modification of processes operating within the wind turbine farm system controller 150.

The second wind turbine site controller process 400 is described with reference to the renewable energy electric generation site 100 and the renewable energy/stored energy electric power generation system integration process 200 discussed above. The second wind turbine site controller process 400 is alternative example of a process performed by the wind turbine farm system controller 150 after the renewable energy/stored energy electric power generation system integration process 200 has been performed. In an example, the second wind turbine site controller process 400 is performed by the wind turbine farm system controller 150 after it has been configured to receive and adjust for the present stored energy electric power input/output power flow level indicator 162. In an example, the wind turbine farm system controller 150 is configured to perform the second wind turbine site controller process 400 in environments where the wind turbine farm system controller 150 is not easily modified or otherwise configured to subtract present stored energy electric power input/output power flow level indicator 162 from the present site output power indication 160.

The second wind turbine site controller process 400 includes receiving, at 402, a stored energy electric generation system present output value. An example of this receiving is the wind turbine farm system controller 150 receiving the present stored energy electric power input/output power flow level indicator 162 from the stored energy electric power generation system 134.

An adjusted output power set point is determined, at 404, by adding the stored energy electric generation system present output value to the site output power set point.

The second wind turbine site controller process 400 also includes providing, at 406, the adjusted output power set point to the controller function for the wind turbine farm. The second wind turbine site controller process 400 then returns to receiving, at 402, a present site output power measurement, as is described above, and further continues with the above described processing.

Figure 5:
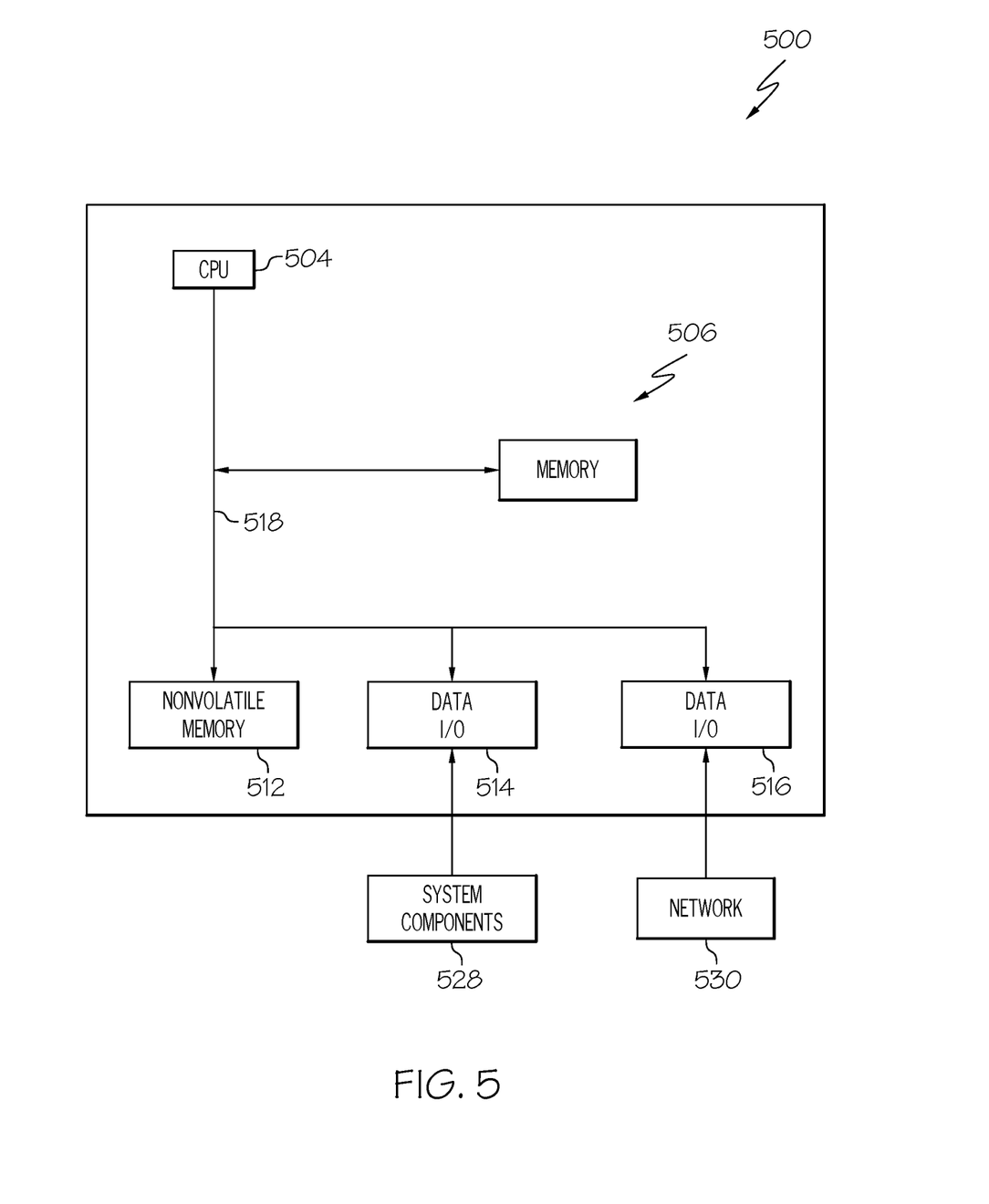
FIG. 5 illustrates a block diagram illustrating a processor, according to an example.

FIG. 5 illustrates a block diagram illustrating a processor 500 according to an example. The processor 500 is an example of a processing subsystem that is able to perform any of the above described processing operations, control operations, other operations, or combinations of these.

The processor 500 in this example includes a CPU 504 that is communicatively connected to a main memory 506 (e.g., volatile memory), a non-volatile memory 512 to support processing operations. The CPU is further communicatively coupled to a network adapter hardware 516 to support input and output communications with external computing systems such as through the illustrated network 530.

The processor 500 further includes a data input/output (I/O) processor 514 that is able to be adapted to communicate with any type of equipment, such as the illustrated system components 528. The data input/output (I/O) processor in various examples is able to be configured to support any type of data communications connections including present day analog and/or digital techniques or via a future communications mechanism. A system bus 518 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of operating an interconnected variable electric power generation system and stored energy electric generation system, the method comprising:

determining a present stored energy system electric power flow value indicating an amount of electric power flowing through a power input/output connection of a stored energy electric power generation system, where the power input/output connection of the stored energy electric power generation system and a variable output electric power generation system are both connected to provide electric power to an electric power output through a site output power meter;

receiving, from the site output power meter, a present site output electric power value indicating a total amount of electrical power provided to the electric power output, where the present site output electric power value indicates a combination of the amount of electric power flowing through the power input/output connection of the stored energy electric power generation system and an amount of electric power output produced by the variable output electric power generation system;

receiving a site power output set point indicating a total output power value that is to be provided through the site output power meter to the electric power output; and maintaining, according to the site power output set point, a present total amount of electric power provided through the site output power meter to the electric power output by controlling, based on both the present site output electric power value and the present stored energy system electric power flow value, the amount of electric power output produced by the variable output electric power generation system.

2. The method of claim 1, where the variable output electric power generation system comprises an existing wind turbine electric generation farm,
where the stored energy electric power generation system has been integrated into the existing wind turbine electric generation farm, and
where the variable output electric power generation system and the existing wind turbine electric generation farm are each dispatched independently from one another.

3. The method of claim 1, further comprising:
receiving a power output set point indicating a total output power for the variable output electric power generation system; and
determining, based on adding the present stored energy system electric power flow value through the power input/output connection of a stored energy electric power generation system to the power output set point, an adjusted output power set point, and
wherein the controlling is further based on maintaining the present site output electric power value at the adjusted output power set point.

4. The method of claim 1, wherein the controlling is based on calculating a difference comprising subtracting the present stored energy system electric power flow value from the present site output electric power value.

5. The method of claim 1, further comprising receiving a power output set point indicating a total output power for the variable output electric power generation system deliver to the electric power output, and
where the controlling the electric power output of the variable output electric power generation system comprises commanding the variable output electric power generation system to produce electric output power based on a difference between the power output set point and the present stored energy system electric power flow value.

6. An interconnected variable electric power generation system and stored energy electric generation system, comprising:
a site output power meter;
a stored energy electric power generation system comprising a power input/output connection connected to provide electric power with a variable output electric power generation system to an electric power output through the site output power meter; and
a variable output electric power generation system controller that when operating:
receives, from the site output power meter, a present site output electric power value indicating a total amount of electrical power provided to the electric power output, where the present site output electric power value indicates a combination of an amount of electric power flowing through the power input/output connection of the stored energy electric power generation system and an amount of electric power output produced by a variable output electric power generation system;
receives an indication of a present stored energy system electric power flow value indicating an amount of electric power flowing through a power input/output connection of the stored energy electric power generation system; and
receives a site power output set point indicating a total output power value that is to be provided through the site output power meter to the electric power output; and
maintains, according to the site power output set point, a present total amount of electric power provided through the site output power meter to the electric power output by controlling, based on both the present site output electric power value and the indication of the present stored energy system electric power flow value, the amount of electric power output produced by the variable output electric power generation system.

7. The interconnected variable electric power generation system and stored energy electric generation system of claim 6, where the variable output electric power generation system comprises an existing wind turbine electric generation farm,
where the stored energy electric power generation system is integrated into the existing wind turbine electric generation farm, and
where the variable output electric power generation system and the existing wind turbine electric generation farm are each dispatched independently from one another.

8. The interconnected variable electric power generation system and stored energy electric generation system of claim 6, where the stored energy electric power generation system and the variable output electric power generation system both provide output electric power to a low voltage side of a site output transformer, and
where the site output power meter is connected to a high voltage side of a site output transformer and conveys electric power to the electric power output.

9. The interconnected variable electric power generation system and stored energy electric generation system of claim 6, where the variable output electric power generation system controller, when operating, is further configured to:
receive a power output set point indicating a total output power for the variable output electric power generation system; and
determine, based on subtracting the present stored energy system electric power flow value through the power input/output connection of a stored energy electric power generation system from the power output set point, an adjusted output power set point, and
wherein the controller, when operating, is configured to control further based on providing the adjusted output power set point to the variable output electric power generation system controller.

10. The interconnected variable electric power generation system and stored energy electric generation system of claim 9, the variable output electric power generation system controller further comprising an auxiliary controller, where the auxiliary controller is configured to, when operating, determine the adjusted output power set point.

11. The interconnected variable electric power generation system and stored energy electric generation system of claim 6, wherein the controller, when operating, is configured to control based on calculating a difference comprising subtracting the present stored energy system electric power flow value from the present site output electric power value.

12. A method of adding a stored energy electric generation system to an operational variable electric power generation system, the method comprising:
adding a stored energy electric power generation system to a power generation system comprising an existing variable output electric power generation system, the existing variable output electric power generation system comprising a controller that controls an electric power output of the existing variable output electric power generation system based on receiving an indicator of a total site electric power output;

connecting a power input/output connection of the stored energy electric power generation system to a power output of the existing variable output electric power generation system, where the power input/output connection of the stored energy electric power generation system and a variable output electric power generation system are both connected to provide electric power to an electric power output through a site output power meter;

providing, to the controller of the existing variable output electric power generation system, an indicator of a present stored energy system electric power flow value through the power input/output of a stored energy electric power generation system; and configuring the controller to adjust an output electric power of the existing variable output electric power generation system based on:

receiving, from the site output power meter, a present site output electric power value indicating a total amount of electrical power provided to the electric power output, where the present site output electric power value indicates a combination of an amount of electric power flowing through the power input/output connection of the stored energy electric power generation system and an amount of electric power output produced by the variable output electric power generation system; and receiving a site power output set point indicating a total output power value that is to be provided through the site output power meter to the electric power output, wherein the controller adjusts the output power of the existing variable output electric power generation system to maintain, according to the site power output set point, a present total amount of electric power provided through the site output power meter to the electric power output by controlling, based on both the present site output electric power value and the present stored energy system electric power flow value, the amount of electric power output produced by the variable output electric power generation system.

13. The method of claim 12, where the existing variable output electric power generation system comprises a wind turbine electric generation farm.

14. The method of claim 12, where the existing variable output electric power generation system and the stored energy electric power generation system are each dispatched independently from one another.

15. The method of claim 12, further comprising:

receiving a power output set point indicating a total output power for the existing variable output electric power generation system; and determining, based on subtracting the present stored energy system electric power flow value through the power input/output connection of a stored energy electric power generation system from the power output set point, an adjusted output power set point, and wherein the controlling is further based on providing the adjusted output power set point to the controller of the existing variable output electric power generation system.

16. The method of claim 12, wherein the receiving an indicator of the total site electric power output comprises receiving a present site output electric power value from a site output power meter, and wherein configuring the controller comprises configuring the controller to:

determining a sum of the present site output electric power value and the indicator of the present stored energy system electric power flow value through the power input/output connection of the stored energy electric power generation system; and controlling, based the sum of the present site output electric power value and the indicator of a present stored energy system electric power flow value through the power input/output connection of a stored energy electric power generation system, the electric power output of the existing variable output electric power generation system.

17. The method of claim 16, further comprising receiving a power output set point indicating a total output power for the existing variable output electric power generation system, and where the controlling the electric power output of the existing variable output electric power generation system comprises commanding the existing variable output electric power generation system to produce electric output power equal to the sum.

18. The method of claim 12, where the stored energy electric power generation system and the existing variable output electric power generation system both provide output electric power to a low voltage side of a site output transformer, and where a site output power meter is connected to a high voltage side of a site output transformer and conveys electric power to the electric power output.

19. The method of claim 18, where the connecting the power input/output connection of the stored energy electric power generation system comprises connecting the power input/output connection to at least one of:

an existing buss structure of the power generation system;

existing overcurrent protection devices of the power generation system; or existing monitoring systems of the power generation systems.

20. The method of claim 18, where the connecting the power input/output connection of the stored energy electric power generation system comprises connecting the power input/output connection to an existing buss structure of the power generation system.

* * * * *